(12) United States Patent
Yu et al.

(10) Patent No.: US 12,535,768 B2
(45) Date of Patent: Jan. 27, 2026

(54) SECURITY VERIFICATION METHOD, CONSUMABLE CHIP, AND CONSUMABLE

(71) Applicant: Zhuhai Pantum Electronics Co., Ltd., Zhuhai (CN)

(72) Inventors: Chengzhu Yu, Zhuhai (CN); Dan Ning, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 604 days.

(21) Appl. No.: 17/877,309

(22) Filed: Jul. 29, 2022

(65) Prior Publication Data

US 2023/0093184 A1    Mar. 23, 2023

(30) Foreign Application Priority Data

Sep. 18, 2021  (CN) .......................... 202111113245.1

(51) Int. Cl.
  *G06F 21/73*  (2013.01)
  *G03G 21/18*  (2006.01)

(52) U.S. Cl.
  CPC ......... *G03G 21/1892* (2013.01); *G06F 21/73* (2013.01)

(58) Field of Classification Search
  CPC ............................ G06F 21/73; G03G 21/1892
  USPC ............................................................ 726/4
  See application file for complete search history.

(56) References Cited

U.S. PATENT DOCUMENTS

| | | | |
|---|---|---|---|
| 7,747,887 B2 * | 6/2010 | Shipton ................... | G06F 21/74 358/1.14 |
| 9,594,897 B2 * | 3/2017 | Lee .......................... | B41J 29/38 |
| 9,876,794 B2 * | 1/2018 | Adkins ............... | H04L 63/0876 |
| 9,924,071 B2 * | 3/2018 | Lee ..................... | G03G 15/0863 |
| 11,134,715 B2 * | 10/2021 | Holtz .................... | H02J 7/0042 |

(Continued)

FOREIGN PATENT DOCUMENTS

| | | |
|---|---|---|
| CN | 102173229 A | 9/2011 |
| CN | 106626792 A | 5/2017 |

(Continued)

OTHER PUBLICATIONS

Indian Patent Office Examination report for Application No. 202214053193 May 21, 2025 9 pages.

*Primary Examiner* — Samson B Lemma
(74) *Attorney, Agent, or Firm* — Anova Law Group, PLLC

(57) ABSTRACT

The present disclosure provides a security verification method, a consumable chip, a consumable chipset, a consumable. The method includes obtaining a preset dynamic parameter configured to determine an authentication sequence; determining authentication sequence data corresponding to a plurality of authentication events according to the preset dynamic parameter; and executing at least one of the plurality of authentication events according to the authentication sequence data and feeding back an authentication result of at least one of the plurality of authentication events to the image forming apparatus. The authentication result is configured to determine whether a consumable corresponding to at least one of consumable chips in the consumable chipset satisfies a preset image forming requirement. The present disclosure effectively avoids the problem of damaging the image forming apparatus and affecting printing quality caused by the use of consumables provided by third parties that do not satisfy requirements.

20 Claims, 3 Drawing Sheets

(56) References Cited

U.S. PATENT DOCUMENTS

| | | | | |
|---|---|---|---|---|
| 11,579,554 | B2* | 2/2023 | Kyotani | G03G 15/55 |
| 11,727,095 | B2* | 8/2023 | Enomoto | H04L 9/3236 |
| | | | | 726/7 |
| 2007/0079125 | A1* | 4/2007 | Adkins | G06F 21/33 |
| | | | | 713/176 |
| 2008/0187357 | A1* | 8/2008 | Miura | G03G 15/0879 |
| | | | | 399/120 |
| 2008/0250480 | A1* | 10/2008 | Meshkat | H04L 9/3226 |
| | | | | 726/6 |
| 2009/0319802 | A1* | 12/2009 | Walmsley | H04L 9/3247 |
| | | | | 713/189 |
| 2013/0321853 | A1* | 12/2013 | Lee | H04N 1/4433 |
| | | | | 358/1.14 |
| 2015/0086014 | A1* | 3/2015 | Adkins | H04N 1/4486 |
| | | | | 380/243 |
| 2015/0089630 | A1* | 3/2015 | Lee | B41J 29/38 |
| | | | | 726/16 |
| 2017/0208059 | A1* | 7/2017 | Shin | H04W 12/069 |
| 2017/0208465 | A1 | 7/2017 | Terao | |
| 2017/0346990 | A1* | 11/2017 | Lee | H04N 1/4433 |
| 2020/0065037 | A1* | 2/2020 | Nishi | G03G 21/1892 |
| 2021/0271971 | A1* | 9/2021 | Guthart | G06F 21/70 |
| 2021/0312021 | A1* | 10/2021 | Enomoto | H04L 9/3236 |
| 2021/0356883 | A1* | 11/2021 | Kim | G03G 15/0863 |
| 2022/0004136 | A1* | 1/2022 | Kyotani | G03G 15/55 |
| 2022/0368543 | A1* | 11/2022 | Hori | H04L 9/0869 |
| 2023/0334129 | A1* | 10/2023 | Enomoto | H04L 9/3271 |

FOREIGN PATENT DOCUMENTS

| | | |
|---|---|---|
| CN | 107065486 A | 8/2017 |
| CN | 109409076 A | 3/2019 |
| CN | 111158229 A | 5/2020 |
| CN | 112099323 A | 12/2020 |
| CN | 112874168 A | 6/2021 |
| CN | 113075869 A | 7/2021 |
| CN | 113138548 A | 7/2021 |
| EP | 3206152 A1 | 8/2017 |
| EP | 3206152 B1 | 9/2018 |
| JP | 2006215208 A | 8/2006 |
| JP | 2008176345 A | 7/2008 |
| JP | 2019109932 A | 7/2019 |
| KR | 20120059387 A | 6/2012 |
| KR | 101912403 B1 | 12/2018 |
| RU | 2719460 C2 | 4/2020 |
| RU | 2741259 C1 | 1/2021 |
| WO | 2017215540 A1 | 12/2017 |

\* cited by examiner

SECURITY VERIFICATION METHOD, CONSUMABLE CHIP, AND CONSUMABLE

CROSS-REFERENCE TO RELATED APPLICATION

This application claims the priority to Chinese patent application No. 202111113245.1, filed on Sep. 18, 2021, in the China National Intellectual Property Administration, the entirety of which is incorporated herein by its reference.

TECHNICAL FIELD

The present disclosure generally relates to the field of image forming technology and, more particularly, relates to a security verification method, a consumable chip, a consumable chipset, and a consumable.

BACKGROUND

As image forming apparatuses, printers are more widely used in offices and homes. Printers generally use toner or ink as main printing consumables. The printing consumables are stored in corresponding consumables (toner cartridges, ink cartridges or the like), and most consumables are equipped with chips. For color printers, there are normally multiple independent sets of consumables, and the chip on each consumable stores data related to the consumable; and when a plurality of consumables is installed in the printer, the chips thereon may communicate or exchange data with the printer. Taking the toner cartridge as an example, the chip on the toner cartridge normally stores fixed data including a production date, a manufacturer, a device code and the like; and also stores variable data, which needs to be updated in a timely manner, including a toner consumption, a number of printed pages, a number of print head cleanings and the like. Most chips installed in toner cartridges (or ink cartridges) are passive memory chips. These chips may only work according to read and write sequence of the printer. That is, the chip communicates with the printer as a slave, and the printer controls the chip. The chip on each toner cartridge (or ink cartridge) acts as a single main body, and the data communication with the printer adopts a one-to-one form, that is, an interaction form between one chip and the printer. There is no authentication between one consumable container chip and another consumable container chip. In such way, consumable containers produced by different manufacturers may be mixed and used, which may easily reduce the printing quality due to compatibility problems. Moreover, when the printer fails or the print quality decreases, it is difficult to distinguish which one or multiple toner cartridges (or ink cartridges) are faulty, which brings great inconvenience to maintenance and use.

SUMMARY

One aspect of the present disclosure provides a security verification method of a consumable chipset, where the consumable chipset includes at least two consumable chips, each consumable chip is detachably installed on a consumable, and the consumable is detachably installed on an image forming apparatus. The method includes obtaining a preset dynamic parameter configured to determine an authentication sequence; determining authentication sequence data corresponding to a plurality of authentication events according to the preset dynamic parameter; and executing at least one of the plurality of authentication events according to the authentication sequence data and feeding back an authentication result of the at least one of the plurality of authentication events to the image forming apparatus. The authentication result is configured to determine whether a consumable corresponding to at least one of consumable chips in the consumable chipset satisfies a preset image forming requirement.

Another aspect of the present disclosure provides a consumable chip, where the consumable chip is capable of being installed on a consumable, and the consumable is capable of being detachably installed on an image forming apparatus. The consumable chip includes a storage unit, configured to store consumable attribute information; and a chip control unit, configured to obtain determined authentication sequence data corresponding to a plurality of authentication events according to a preset dynamic parameter configured to determine an authentication sequence.

Another aspect of the present disclosure provides a consumable chipset, where the consumable chipset includes at least two consumable chips, each consumable chip is capable of being installed on a consumable, and the consumable is capable of being detachably installed on an image forming apparatus. The consumable chipset includes a storage unit, configured to store consumable attribute information; an obtaining unit, configured to obtain determined authentication sequence data corresponding to a plurality of authentication events according to a preset dynamic parameter configured to determine an authentication sequence; and a control unit, configured to execute at least one of the plurality of authentication events according to the authentication sequence data and feeding back an authentication result of the at least one of the plurality of authentication events to the image forming apparatus, where the authentication result is configured to determine whether at least one consumable, corresponding to the authentication event, in the consumable chipset satisfies a preset image forming requirement.

Another aspect of the present disclosure provides a consumable. The consumable includes a developer accommodating portion for accommodating a developer, and a consumable chip. The consumable chip is capable of being installed on a consumable, and the consumable is capable of being detachably installed on an image forming apparatus. The consumable chip includes a storage unit, configured to store consumable attribute information; and a chip control unit, configured to obtain determined authentication sequence data corresponding to a plurality of authentication events according to a preset dynamic parameter configured to determine an authentication sequence.

Another aspect of the present disclosure provides a consumable. The consumable includes a photosensitive portion; a charging portion, configured to charge the photosensitive portion; and a consumable chip. The consumable chip is capable of being installed on a consumable, and the consumable is capable of being detachably installed on an image forming apparatus. The consumable chip includes a storage unit, configured to store consumable attribute information; and a chip control unit, configured to obtain determined authentication sequence data corresponding to a plurality of authentication events according to a preset dynamic parameter configured to determine an authentication sequence.

Another aspect of the present disclosure provides an image forming apparatus. The apparatus includes a consumable; a consumable chipset, where the consumable chipset includes at least two consumable chips, and each consumable chip is detachably installed on a consumable; an obtaining unit, configured to obtain a preset dynamic parameter configured to determine an authentication sequence; a determining unit, configured to determine authentication sequence data corresponding to a plurality of authentication events according to the preset dynamic parameter; a first control unit, configured to execute at least one authentication event according to the authentication sequence data and feeding back an authentication result of the at least one authentication event to a second control unit; and the second control unit, configured to determine, according to the authentication result of the at least one authentication event, whether a consumable corresponding to at least one of consumable chips in the consumable chipset satisfies a preset image forming requirement.

Other aspects of the present disclosure may be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

DETAILED DESCRIPTION

In order to make the objectives, technical solutions and advantages of the present disclosure clear, the present disclosure is further described in detail below with reference to the accompanying drawings and embodiments. It should be understood that the specific embodiments described herein are merely used to explain the present disclosure, but not to limit the present disclosure.

In embodiments of the present disclosure, an image forming apparatus is configured to perform image forming operations, such as generating, printing, receiving and transmitting image data. Examples of image forming apparatuses include ink jet printers, laser printers, LED (light emitting diode) printers, copiers, facsimile machines, scanners or all-in-one machines, and multifunction peripherals that perform above functions in a single device (MFP, multi-functional peripheral). The image forming apparatus includes an image forming control unit and an image forming unit. The image forming control unit is configured to control entire image forming apparatus, and the image forming unit is configured to form an image on a conveyed sheet under the control of the image forming control unit according to image data.

Figure 1:
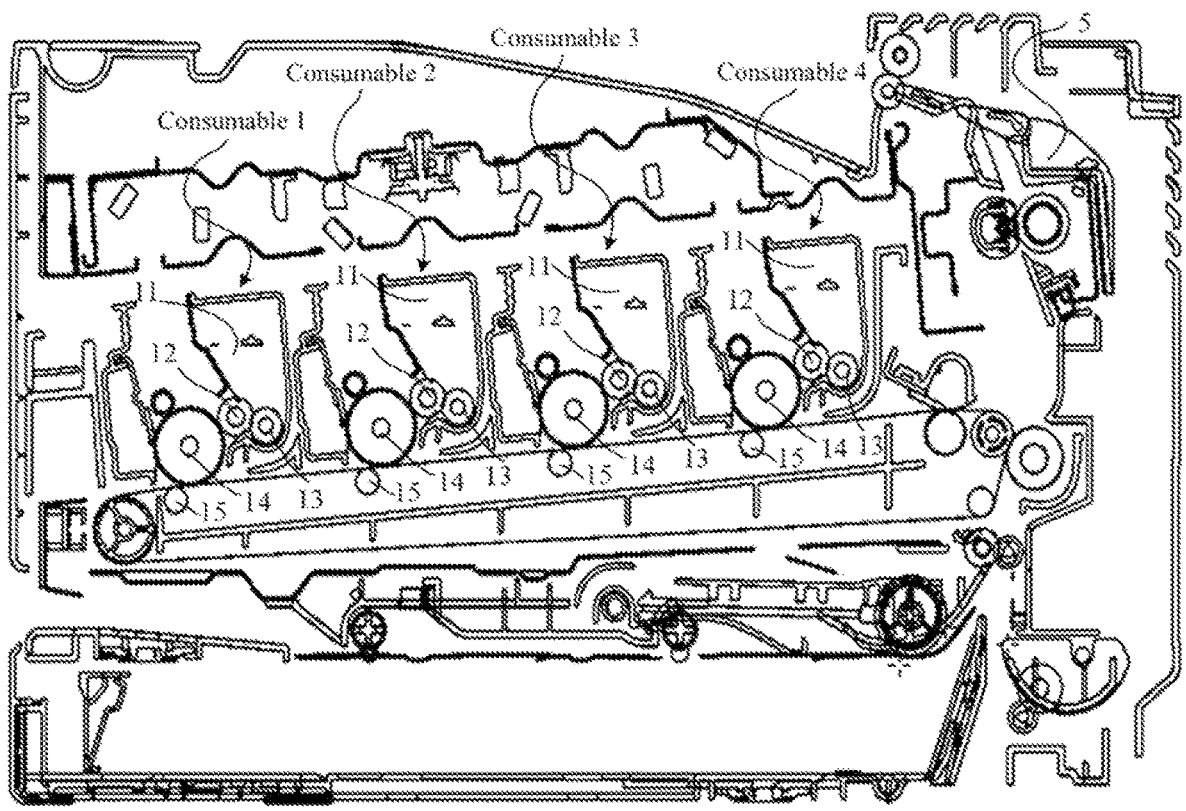
FIG. 1 illustrates a structural schematic of an image forming apparatus provided by exemplary embodiments of the present disclosure.

FIG. 1 illustrates a structural schematic of an image forming apparatus provided by exemplary embodiments of the present disclosure. Referring to FIG. 1, as an example of the image forming apparatus, the image forming unit of the image forming apparatus may include a developer accommodating portion 11, a developing element 12, a developer conveying element 13, a photosensitive element 14, a transfer element 15, a fixing assembly 5, and the like. After papers to be printed move along a paper feeding direction and pass through the toner feeding operation of the developer conveying element 13 and the developing operation of the developing element 12 in sequence, the papers to be printed may reach the holding area between the photosensitive element 14 and the transfer element 15 for transferring, and then the papers to be printed may pass the fixing assembly 5 for fixing, thereby completing the image forming operation.

The developer accommodating portion 11 may be configured to accommodate a developer. The developer may be a material including color toner, carbon toner, and the like. The developing element 12 may include elements including a developing roller, configured to convey the developer to a photosensitive drum. The developer conveying element 13 may include elements including a toner feeding roller and the like, configured to convey the developer to the developing element 12; and may be replaced with elements such as a toner feeding screw and the like. The photosensitive element 14 may include a photosensitive drum (e.g., organic photoconductor drum (OPC)), a charging roller, and the like, where the charging roller may be configured to charge the photosensitive drum.

Normally, the image forming apparatus may be detachably installed with at least one consumable. Take the image forming apparatus shown in FIG. 1 as an example, the image forming apparatus may be detachably installed with 4 consumables (a consumable 1, a consumable 2, a consumable 3, and a consumable 4 respectively shown in FIG. 1). Four consumables may be configured to provide the image forming apparatus with developers with four colors including black K, cyan C, magenta M, and yellow Y. Obviously, in other embodiments, the number of consumables installed in the image forming apparatus may be increased or decreased, for example, may be 1, 6, or the like, which may not be limited in the present disclosure.

The consumable chip may be a circuit substrate installed on the consumable, and the circuit substrate may include a storage device and an electrical contact connected with the storage device. The electrical contact may be configured to be connected with a terminal of the image forming apparatus when the consumable is installed on the image forming apparatus. Above-mentioned contact and terminal may respectively be electrical contact portions on the side of the consumable chip and the side of the image forming apparatus. The electrical contact portion may be a conductive plane, a conductive probe, a conductive coil, or the like.

The consumable chip may be a circuit substrate installed on the consumable, and the circuit substrate may include a storage device and a contact connected to the storage device. The contact may be configured to connect with the pin on the image forming apparatus side.

For the consumables with the consumable chips installed, in an implementation manner, the consumables may only include the developer accommodating portion 11.

In an implementation manner, the consumables may be a split structure. For example, the consumables (1, 2, 3 or 4) may include mutually detachable developing cartridges and drum cartridges. The developing cartridge may be provided with a developing cartridge chip, which is configured to store information such as the developer content, the number of printed pages and the like; the drum cartridge may be provided with a drum cartridge chip, which is configured to store information such as the name of the photosensitive drum manufacturer, the service life of the photosensitive drum and the like; the developing cartridge may include a casing, the developer accommodating portion 11, the developing member 12 and/or the developer conveying member 13; and the drum cartridge may include the photosensitive member 14, that is, a photosensitive drum and a charging roller.

In an implementation manner, the consumables may be above-mentioned developing cartridge.

In an implementation manner, the consumable may be above-mentioned drum cartridge.

In an implementation manner, the consumables may be an integrated structure. For example, the consumables (1, 2, 3, or 4) may include the developer accommodating portion 11, the developing member 12, the developer conveying member 13, the photosensitive member 14, and the like.

It should be noted that the consumables mentioned in one embodiment may also be other components, parts, and units in the image forming apparatus that are easily damaged and need to be replaced, such as paper boxes, toner cartridges and the like, which may also belong to the technical solution corresponding to the consumables protected by the present disclosure. Meanwhile, the consumable chip may also be authenticated with the image forming apparatus to prevent the image forming apparatus from using consumables that cannot meet the preset quality requirements to perform image forming.

Figure 2:
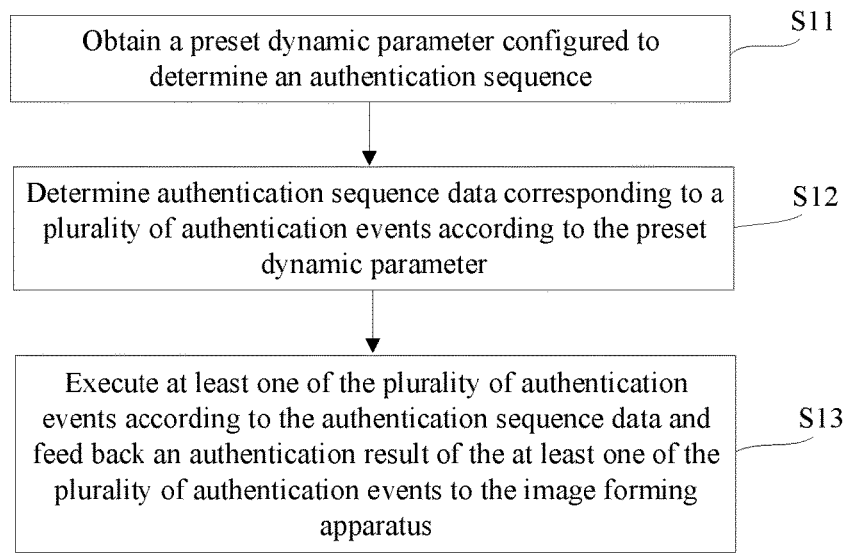
FIG. 2 illustrates a flow chart of a security verification method of a consumable chipset provided by exemplary embodiments of the present disclosure.

Referring to FIG. 2, FIG. 2 illustrates a flow chart of a security verification method of a consumable chipset provided by exemplary embodiments of the present disclosure. The consumable chipset may include at least two consumable chips, each consumable chip may be detachably installed on one consumable, and the consumable may be detachably installed on the image forming apparatus. It should be noted that, one consumable chip or a plurality of consumable chips may be installed on one consumable, which may not be limited herein. Each consumable chip may be preset to store consumable attribute information such as consumable serial number, model, consumable manufacturer, consumable manufacturing date, consumable service life, consumable color and other consumable attribute information.

The security verification method may include following exemplary steps.

At S11, the preset dynamic parameter configured to determine the authentication sequence may be obtained.

For example, the preset dynamic parameter may be a measurable parameter or a non-measurable parameter. The measurable parameter may refer to parameters that may be quantified, and the magnitudes of two measurable parameters may be compared.

For example, the execution main body of step S11 may be an image forming apparatus or may be one or more consumable chips in a consumable chipset, which may not be limited herein.

Measurable parameters may include, but may not be limited to, consumable consumption information such as information on the remaining consumable amount of and the number of printable pages; a plurality of random numbers generated by one or more consumable chips in the image forming apparatus or consumable chipset; time information required for each consumable chip in the consumable chipset to execute a preset algorithm; and preset signal response time corresponding to each consumable chip in the consumable chipset.

Obviously, the measurable parameters may also be parameters determined according to a preset algorithm according to at least two kinds of data among the above-mentioned consumables consumption information and random numbers, time information, and preset signal response time, which may not be limited herein.

Non-measurable parameters may include, but may not be limited to, current status information of each consumable chip, and the status information may include the competitive status and the non-competitive status. The status information may be configured to determine the occurrence sequence of authentication events corresponding to all consumable chips. The authentication event corresponding to the consumable chip in the competitive status may occur earlier than the authentication event corresponding to the consumable chip in the non-competitive status.

Compared with fixed parameters, the preset dynamic parameter in the present disclosure may not be fixed data, but data that may be changed randomly. Therefore, the authentication sequence data determined according to the preset dynamic parameter may not be fixed each time.

At S12, authentication sequence data corresponding to a plurality of authentication events may be determined according to preset dynamic parameter.

For example, the authentication event may be that any one consumable chip in the consumable chipset authenticates other consumable chips in the consumable chipset respectively.

The plurality of authentication events may be at least one authentication event, and the maximum number of authentication events may be related to the number of consumable chips in the consumable chipset. For example, when the consumable chipset includes two consumable chips, the maximum number of authentication events is 2. Two consumable chips included in the consumable chipset may be No. 1 consumable chip and No. 2 consumable chip, respectively. Two authentication events involved may include the authentication of the No. 2 consumable chip by the No. 1 consumable chip (a authentication event), and the authentication of the No. 1 consumable chip by the No. 2 consumable chip (b authentication event).

For the convenience of description, subsequently, authentication of a consumable chip in the consumable chipset to other consumable chips in the consumable chipset may be respectively referred to as the authentication events corresponding to a consumable chip/consumable.

For example, four consumables may be disposed in the image forming apparatus, which may be toner cartridges of four colors including C (cyan), M (magenta), Y (yellow), and K (black). The toner cartridge chip of the C toner cartridge may authenticate the toner cartridge chips of other three toner cartridges respectively; and corresponding authentication events may be the authentication events corresponding to the C toner cartridge. The toner cartridge chip of the M toner cartridge may authenticate the toner cartridge chips of other three toner cartridges respectively; and corresponding authentication events may be the authentication events corresponding to the M toner cartridge. The toner cartridge chip of the Y toner cartridge may authenticate the toner cartridge chips of other three toner cartridges respectively; and the corresponding authentication events may be the authentication events corresponding to the Y toner cartridge. The toner cartridge chip of the K toner cartridge may authenticate the toner cartridge chips of other three toner cartridges respectively; and the corresponding authentication events may be the authentication events corresponding to the K toner cartridge.

The authentication sequence data may be configured to indicate the occurrence sequence of at least one authentication event in the plurality of above-mentioned authentication events. The authentication sequence data may be configured to indicate the first authentication event, the sequence of a part of authentication events, or the sequence of all authentication events, which may not be limited herein.

Determination of the authentication sequence data may be determined by the image forming apparatus according to obtained preset dynamic parameter or may be determined by one consumable chip or a plurality of consumable chips in the consumable chipset according to obtained preset dynamic parameter.

In the present disclosure, parameters such as consumable consumption information, random numbers and other parameters may be configured to determine the occurrence sequence of authentication events corresponding to all consumable chips in the consumable chipset, so that all consumable chips may authenticate other consumable chips according to determined occurrence sequence, which may avoid conflict and interference. In addition, the occurrence sequence of authentication events corresponding to all consumable chips in the consumable chipset may be determined through dynamic parameters such as consumables consumption information and random numbers, and the randomness may be higher, such that the reliability of mutual authentication between all consumable chips may be higher, and the execution sequence of all authentication events may not be fixed. Therefore, the difficulty of reverse cracking of subsequent security verification solution may be improved, and the problems of damaging the image forming apparatus and affecting the printing quality caused by the use of consumables provided by third parties that do not meet the requirements may be avoided.

The manners configured to determine the authentication sequence data corresponding to the plurality of authentication events according to the preset dynamic parameter may include following exemplary manners.

In embodiment one, when the preset dynamic parameter is a measurable parameter, the authentication sequence data may be determined according to the magnitude relationship among measurable parameters corresponding to all consumable chips.

For example, obtained measurable parameters in the consumable chipset may be sequenced according to a preset rule, thereby determining the authentication sequence data.

In an optional implementation manner, when the preset dynamic parameter is the consumable consumption information corresponding to each consumable chip in the consumable chipset, the authentication sequence data may be determined according to the magnitude relationship among consumable consumption information corresponding to each consumable chip in the consumable chipset.

In an optional implementation manner, when the preset dynamic parameter is a calculated value obtained by combining the consumable consumption information and a preset random number, the authentication sequence data may be determined according to the calculated value corresponding to each consumable chip in the consumable chipset.

In an optional implementation manner, when the preset dynamic parameter is a plurality of random numbers generated by the plurality of consumable chips in the consumable chipset, the authentication sequence data may be determined according to the magnitude relationship among random numbers corresponding to the plurality of consumable chips in the consumable chipset.

In an optional implementation manner, when the preset dynamic parameter is the time information required by each consumable chip in the consumable chipset to execute a preset algorithm, the authentication sequence data may be determined according to the magnitude relationship among the time information required by each consumable chip in the consumable chipset to execute the preset algorithm.

A timer may be configured in each consumable chip in the consumable chipset. After receiving a preset instruction or preset signal sent by the image forming apparatus, the timer may start from zero, and each consumable chip may start to execute the preset algorithm. After completing the execution of the preset algorithm, the timer may end and output the time information required to execute the preset algorithm; the time information required by all consumable chips in the consumable chipset to execute the preset algorithm may be sequenced from small to large, and the occurrence sequence of the authentication events corresponding to all consumable chips may be determined according to the sequence. For example, the authentication event corresponding to the consumable chip with the shortest consumption time may be determined as the authentication event that occurs first; that is, the authentication event corresponding to the consumable chip with the longest consumption time may be determined as the authentication event that occurs last.

In an optional implementation manner, when the preset dynamic parameter is the response time of the preset signal corresponding to each consumable chip in the consumable chipset, the authentication sequence data may be determined according to the magnitude relationship of the response time of the preset signal corresponding to all consumable chips in the consumable chipset.

Each consumable chip in the consumable chipset may receive the instruction sent by the image forming apparatus and return response information to the image forming apparatus; and the occurrence sequence of the authentication events corresponding to all consumable chips may be determined according to the occurrence sequence of all consumable chips returning the response information. For example, the authentication event corresponding to the consumable chip that responds to the response information first may occur first, and the authentication event corresponding to the consumable chip that responds to the response information last may occur last.

Furthermore, determined execution main body of the authentication sequence data may be one consumable chip (for convenience of description, the consumable chip is referred to as the proxy chip hereinafter) in the image forming apparatus or the consumable chipset or may be a plurality of consumable chips in the consumable chipset. consumable chips, which may not be limited herein.

For convenience of description, the following uses the consumable consumption information corresponding to each consumable chip in the consumable chipset as an example to describe how to determine the authentication sequence data.

For example, the consumable consumption information may be recorded in the storage unit of each consumable chip, and the consumable consumption information corresponding to each consumable chip may be obtained by accessing the storage unit of the consumable chip to obtain corresponding consumable consumption information.

The proxy chip may be randomly determined by each consumable chip in the consumable chipset according to a preset rule or may be designated by default by the consumable chipset or may be designated by the image forming apparatus by default or may be determined by the image forming apparatus according to a preset rule, which may not be limited herein.

Optionally, when the proxy chip is randomly determined by each consumable chip in the consumable chipset according to a preset rule, for example, may be determined by the magnitude of the random number corresponding to each consumable chip in the consumable chipset, the color information, and the response occurrence sequence of the preset signal.

When the execution main body in embodiment one is the image forming apparatus or the proxy chip and when the consumable consumption information corresponding to the consumable chip in the consumable chipset is obtained, the sequence information may be generated by performing sequencing according to a preset rule, thereby determining the authentication sequence data according to the sequence information.

When the execution main body in embodiment one is the plurality of consumable chips in the consumable chipset, a consumable chip (the first chip) may obtain its own consumable consumption information and obtain the consumable consumption information of one consumable chip (the second chip) in other consumable chips respectively; then the magnitudes may be compared pairwise to determine the first authentication event to be executed. Next, the second chip may obtain its own consumable consumption information and obtain the consumable consumption information of one consumable chip (third chip) in other consumable chips respectively; then the magnitudes may be compared pairwise to determine the second authentication event to be executed. According to the same standard, the sequence of other authentication events may be determined, and the authentication sequence data may be generated.

When the execution main body in embodiment one is the plurality of consumable chips in the consumable chipset, the plurality of consumable chips may obtain their respective consumable consumption information, and the sequence information may be generated by performing sequencing according to a preset rule, thereby determining the authentication sequence data.

For example, above-mentioned preset dynamic parameter may be the consumable consumption information, for example, the remaining consumable amount. The image forming apparatus may be disposed with four consumables, which are toner cartridges with four color including C (cyan), M (magenta), Y (yellow), and K (black). The image forming apparatus may determine the authentication sequence data. Above-mentioned embodiment one may include following exemplary steps.

a) If the remaining consumable amounts of four CMYK toner cartridges are different, the remaining amounts of four CMYK toner cartridges from large to small may be sequenced first to determine the authentication sequence data. For example, after sequencing the remaining consumable amounts from large to small, the sequence result may be C toner cartridge, M toner cartridge, Y toner cartridge, and K toner cartridge, so that it determines that the occurrence sequence of the authentication events corresponding to four toner cartridges may be the authentication event corresponding to C toner cartridge, the authentication event corresponding to M toner cartridge, the authentication event corresponding to Y toner cartridge, and the authentication event corresponding to K toner cartridge. That is, the authentication corresponding to the consumable chip (C toner cartridge) with the most remaining consumable amount may be executed first; and the authentication events corresponding to the consumable chips ranked second (M toner cartridge), third (Y toner cartridge), and fourth (K toner cartridge) in sequence according to the remaining consumable amounts may be executed in a descending sequence. Obviously, above-mentioned authentication sequence may also be the authentication event corresponding to K toner cartridge, the authentication event corresponding to Y toner cartridge, the authentication event corresponding to M toner cartridge, and the authentication event corresponding to C toner cartridge. That is, the authentication event corresponding to the consumable chip with the least consumable remaining amount may be executed first; and other authentication events corresponding to the consumable chips ranked second, third, and fourth in a descending sequence of the remaining consumable amount may be executed sequentially.

b) When there are at least two toner cartridges with a same remaining consumable amount, for example, the remaining consumable amounts in the C toner cartridge and the K toner cartridge are same, after sequencing the remaining consumable amount from small to large, the sequence result may be M toner cartridge, Y toner cartridge, and C toner cartridge and K toner cartridge which are tied. Other dynamic parameters may be introduced to determine the occurrence sequence of the authentication events corresponding to C toner cartridge and the authentication events corresponding to K toner cartridge. For example, other dynamic parameters may be color information. That is, the occurrence sequence of the authentication events corresponding to C toner cartridge and the authentication events corresponding to K toner cartridge may be determined according to the color information. For example, the occurrence sequence of the authentication event corresponding to K toner cartridge may be later than that of C toner cartridge. Obviously, it may also determine, according to the color information, that the authentication event corresponding to C toner cartridge is later than the authentication event corresponding to K toner cartridge, which may not be limited herein.

In embodiment two, when the preset dynamic parameter is a plurality of random numbers or a calculation result generated according to the plurality of random numbers in combination with a preset threshold, the authentication sequence data corresponding to the plurality of authentication events may be determined according to the preset dynamic parameter in combination with a pre-stored corresponding relationship between consumable chips and a determination factor of the authentication sequence data.

Optionally, the pre-stored corresponding relationship between the consumable chips and the determination factor of the authentication sequence data may be stored in the image forming apparatus, including being stored in a storage unit or a computer program of the image forming apparatus.

Optionally, above-mentioned pre-stored corresponding relationship between the consumable chips and the determination factor of the authentication sequence data may be stored in the consumable chip.

Above-mentioned corresponding relationship for characterizing the consumable chips and the determination factor of the authentication sequence data refers to the corresponding relationship between the consumables chip and the determination factor of the authentication sequence data.

Above-mentioned preset algorithm example may be a remainder algorithm; obviously, other algorithms such as division and multiplication may also be used, which may not be limited herein.

The determination factor of the authentication sequence data may be a specific numerical value or a numerical range, which may not be limited herein.

Optionally, above-mentioned preset threshold may be the quantity of consumable chips in the consumable chipset, or may be other randomly set values, which may not be limited herein.

The execution main body in embodiment two may be an image forming apparatus, a proxy chip, or may be a plurality of consumable chips in the consumable chipset.

The determination manner of the authentication sequence data in embodiment two may include following examples.

In the first implementation manner of embodiment two, when the preset dynamic parameter is a calculation result generated by a preset algorithm according to a plurality of random numbers in combination with a preset threshold, the authentication sequence data may be determined according to the calculation result in combination with above-mentioned corresponding relationship.

In an optional implementation manner, the image forming apparatus may obtain the calculation result generated by the preset algorithm in combination with the plurality of random numbers and the preset threshold and determine the authentication sequence data according to the calculation result and pre-stored corresponding relationship.

The image forming apparatus may obtain the calculation result generated by the preset algorithm in combination with the plurality of random numbers according to the preset threshold, which may include that the image forming apparatus may obtain the plurality of random numbers from itself or communication with one or more consumable chips in the consumable chipset and generate the calculation result, or the image forming apparatus may directly communicate with at least one consumable chip in the consumable chipset to obtain above calculation result, which may not be limited in the present disclosure.

The image forming apparatus may obtain above-mentioned corresponding relationship by obtaining above-mentioned corresponding relationship from itself, or by communicating with at least one consumable chip in the consumable chipset to obtain above-mentioned corresponding relationship, which may not be limited in the present disclosure.

After obtaining above-mentioned calculation result and corresponding relationship, the image forming apparatus may determine whether the calculation result corresponds to any consumable chip in the consumable chipset. If the calculation result corresponds to a consumable chip in the consumable chipset, the authentication sequence of the authentication event corresponding to the consumable chip may be determined, and if the calculation result does not correspond to any consumable chip in the consumable chipset, above calculation result may be obtained again.

For example, above-mentioned preset algorithm may be a remainder operation, and above-mentioned determination factor of the authentication sequence may be a specific value. The image forming apparatus may generate a random number and then generate a remainder corresponding to the random number according to the random number. The toner cartridges C, M, Y, and K may correspond to a generated remainder respectively. When the remainder generated by the image forming apparatus is consistent with the remainder corresponding to any one of CMYK toner cartridges, such toner cartridge may be specified to start verification. Generating the remainder corresponding to the random number according to the random number may be performing a remainder operation on the random number and the preset threshold to generate the remainder corresponding to the random number.

Further, following exemplary steps may be included.

a) The image forming apparatus may first generate a random number M and generate a remainder corresponding to the random number M. Each of four CMYK toner cartridges may respectively correspond to a remainder. That is, the remainder 1 corresponds to C toner cartridge, the remainder 2 corresponds to M toner cartridge, the remainder 3 corresponds to Y toner cartridge, and the remainder 4 corresponds to K toner cartridge.

b) If the remainder corresponding to the random number M corresponds to the remainder corresponding to any one of four toner cartridges X, it determines that the authentication event that occurs first may be the authentication event corresponding to the toner cartridge X.

c) A random number N may be randomly generated, and the remainder corresponding to the random number N may be generated. If the remainder corresponding to the random number N is consistent with the remainder corresponding to the toner cartridge X, the random number may need to be regenerated. If it is inconsistent, when the remainder corresponding to the random number N corresponds to the remainder of any toner cartridge Z except for the toner cartridge X, it determines that the authentication event that occurs second may be the authentication event corresponding to the toner cartridge Z. The random number N is different from the random number M.

d) Similarly, the third and fourth occurred authentication events may be determined.

The toner cartridge X or Z may be any one of the CMYK toner cartridges, and the selection rule for the toner cartridges X and Z may be performed according to above-mentioned steps.

Figure 3:
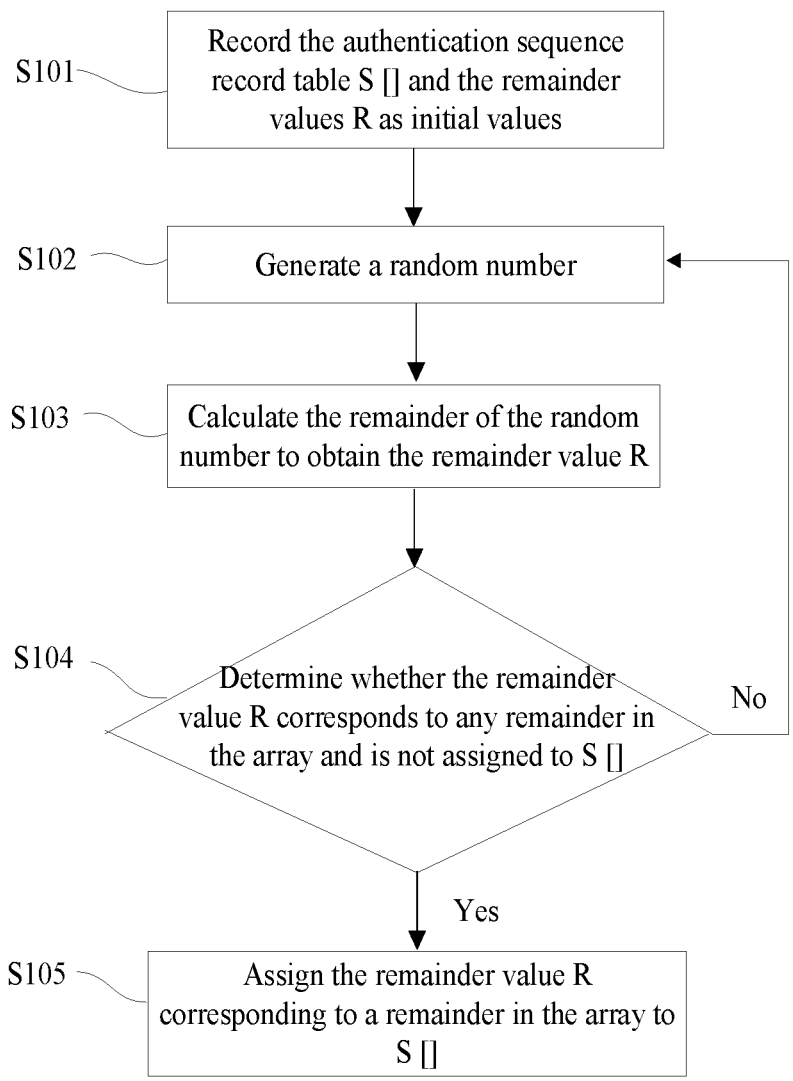
FIG. 3 illustrates a flow chart of a method for determining authentication sequence data provided by exemplary embodiments of the present disclosure.

For example, referring to FIG. 3, the method, including that the image forming apparatus may obtain the calculation result generated by the preset algorithm in combination with the plurality of random numbers and the preset threshold and determine the authentication sequence data according to the calculation result and pre-stored corresponding relationship, may include following exemplary steps.

At S101, the authentication sequence record table S [ ] and the remainder values R may be recorded as initial values.

Taking four color toner cartridges (i.e., C, M, Y, K) as an example, four toner cartridges may correspond to the remainders in the array (the array includes the remainders 0, 1, 2, and 3) in a one-to-one correspondence. For example, 0 corresponds to C toner cartridge, 1 corresponds to M toner cartridge, 2 corresponds to Y toner cartridge, and 3 corresponds to K toner cartridge.

For example, a plurality of toner cartridges may need to record multiple pieces of toner cartridge information. In one embodiment, initialization may be performed first, which is expressed in C language as memset (S, 0x00, number); the remainder value R may be a byte in a value range of 0~n~1, and a random number may be generated to calculate the remainder of a preset threshold; the remainder value may be stored in S[ ] until the S[ ] array is full; and the authentication order data may be determined according to the contents of the array. The storage location of the authentication sequence may be in S [ ] which may be obtained by calculating the remainder of the random number. S [ ] may be initially cleared or not. The remainder R may also be assigned according to the random number, so that the initial value may equal to 0 or other digits. The final result of S [

] may be obtained by calculating the remainder according to the random number, which may indicate that S [ ] is assigned with determined values.

At S102, a random number may be generated.

At S103, the remainder of the random number may be calculated to obtain the remainder value R.

The remainder of the random number may be the remainder value R obtained by the remainder algorithm according to the random number and the number of consumable chips. If the consumable is a one-piece structure, the number of consumable chips may be 4; if the consumable is a split structure, the number of consumable chips may be 8.

Obviously, the remainder value R may also be obtained by the remainder algorithm according to the random number and other randomly set values, which may not be limited herein.

At S104, whether the remainder value R corresponds to any remainder in the array and is not assigned to S [ ] may be determined. If the determination result is yes, go to step S105, and if the determination result is no, return to step S102.

At S105, the remainder value R corresponding to a remainder in the array may be assigned to S [ ].

The authentication sequence record table S [ ] may indicate the authentication sequence of the toner cartridges. For example, if S [ ]=S [2 3 1 0], the authentication sequence corresponding to four authentication events may be the authentication event corresponding to Y toner cartridge, the authentication event corresponding to K toner cartridge, the authentication event corresponding to M toner cartridge, and the authentication event corresponding to C toner cartridge. Obviously, the authentication sequence corresponding to four authentication events may also be the authentication event corresponding to C toner cartridge, the authentication event corresponding to M toner cartridge, and the authentication event corresponding to K toner cartridge and the authentication event corresponding to Y toner cartridge.

In another optional implementation manner, the proxy chip may obtain the calculation result generated by the preset algorithm in combination with the plurality of random numbers and the preset threshold, and then determine the authentication sequence data according to the calculation result and pre-stored corresponding relationship.

For example, the proxy chip may obtain the plurality of random numbers from itself, the image forming apparatus, or communication with at least one other consumable chip in the consumable chipset, and then generate the calculation result; or the proxy chip may directly communicate with at least one other consumable chip in the consumable chipset or the image forming apparatus to obtain above-mentioned calculation result, which may not be limited in the present disclosure.

The manner for the proxy chip to obtain above-mentioned corresponding relationship may be as follows: the proxy chip may obtain above-mentioned corresponding relationship from itself or obtain above-mentioned corresponding relationship from other consumable chips in the consumable chipset or communication with the image forming apparatus, which may not be limited in the present disclosure.

After obtaining above-mentioned calculation result and corresponding relationship, the proxy chip may determine whether the calculation result corresponds to any consumable chip in the consumable chipset. If the calculation result corresponds to any consumable chip in the consumable chipset, the authentication sequence of the authentication event corresponding to the consumable chip may be determined, and if the calculation result does not correspond to any consumable chip in the consumable chipset, above-mentioned calculation result may be obtained again.

Specific implementation manner may be same as above-mentioned manner of determining the authentication sequence, which may not be described in detail herein.

In another possible implementation manner, the plurality of consumable chips in the consumable chipset may obtain the calculation result generated by the preset algorithm according to the plurality of random numbers in combination with the preset threshold, and the authentication sequence data may be determined according to the calculation result in combination with pre-stored corresponding relationship.

The plurality of consumable chips in the consumable chipset may obtain the calculation result generated by the preset algorithm according to the plurality of random numbers in combination with the preset threshold, which may include that plurality of consumable chips in the consumable chipset may obtain the plurality of above-mentioned random numbers from itself and communication with the image forming apparatus, and then generate the calculation result, or above-mentioned calculation result may also be obtained directly from the image forming apparatus for the plurality of chips.

The plurality of consumable chips may obtain above-mentioned corresponding relationship from themselves or through communication with the image forming apparatus, which may not be limited herein.

After obtaining above-mentioned calculation result and corresponding relationship respectively, the plurality of consumable chips in the consumable chipset may determine whether the calculation result corresponds to itself. If the calculation result corresponds to itself, the authentication sequence of the authentication event corresponding to the consumable chip may be determined, and if the calculation result does not correspond to itself, above-mentioned calculation result may be obtained again.

Specific implementation manner of obtaining the random number and separately generating the calculation result according to the random number and the preset threshold according to the preset algorithm may be same as above-mentioned implementation manner, which may not be limited herein.

In the second implementation manner of embodiment two, the preset dynamic parameter may be a plurality of random numbers, and the authentication sequence data may be determined according to the plurality of random numbers and above-mentioned corresponding relationship.

In an optional implementation manner, the image forming apparatus may obtain the plurality of random numbers, and then determine the authentication sequence data according to the random numbers in combination with pre-stored corresponding relationship.

The image forming apparatus obtaining the plurality of random numbers may include that the image forming apparatus may obtain the plurality of random numbers from itself or communication with at least one consumable chip in the consumable chipset.

The manner for the image forming apparatus obtaining above-mentioned corresponding relationship may be as follows: the image forming apparatus may obtain the plurality of random numbers from itself or communicating with at least one consumable chip in the consumable chipset.

After obtaining the random number and the corresponding relationship, the image forming apparatus may determine whether the random number corresponds to any consumable chip in the consumable chipset. If the random number corresponds to any consumable chip in the consumable chipset, the authentication sequence of the authentication events corresponding to the consumable chip may be determined, and if the random number does not correspond to any consumable chip in the consumable chipset, above-mentioned random number may be obtained again.

For example, above-mentioned random number may be directly generated by the image forming apparatus, above-mentioned determination factor of authentication sequence may be a numerical range, and the toner cartridges C, M, Y, and K may correspond to a generated random number range, respectively. When the random number generated by the image forming apparatus is within the random number range corresponding to any one of the CMYK toner cartridges, the occurrence sequence of the authentication event corresponding to the toner cartridge may be determined.

Furthermore, following exemplary steps may be included.

a) The image forming apparatus may first generate a random number M, and four CMYK toner cartridges may correspond to a random number range, respectively. That is, the random number range 0~10 corresponds to C toner cartridge, the random number range 11~20 corresponds to M toner cartridge, the random number range 21~30 corresponds to Y toner cartridge, and the random number range 31~40 corresponds to K toner cartridge.

b) When the random number M corresponds to the random number range corresponding to any one of four toner cartridges X, it determines that the authentication event corresponding to the toner cartridge X may occur first.

c) Next, a random number N may be randomly generated. If the random number N is consistent with the random number range corresponding to the toner cartridge X, the random number N may need to be regenerated. If it is inconsistent, when the random number N corresponds to the random number range of any toner cartridge Z except the toner cartridge X, it determines that the authentication event that occurs second may be the authentication event corresponding to the toner cartridge Z. The random number N is different from the random number M.

d) Similarly, the third and fourth occurred authentication events may be determined.

The toner cartridge X or Z may be any one of CMYK toner cartridges, and the selection rule for the toner cartridges X and Z may be performed according to above-mentioned steps.

In another optional implementation manner, the proxy chip may obtain the plurality of random numbers, and then determine the authentication sequence data according to obtained random numbers in combination with pre-stored corresponding relationship.

For example, the proxy chip may obtain the plurality of random numbers from itself, the image forming apparatus, or communication with other consumable chips in the consumable chipset, which may not be limited in the present disclosure.

The manner for the proxy chip to obtain above-mentioned corresponding relationship may be as follows: the proxy chip may obtain above-mentioned corresponding relationship from itself or obtain above-mentioned corresponding relationship from other consumable chips in the consumable chipset or communication with the image forming apparatus, which may not be limited in the present disclosure.

After obtaining above-mentioned calculation result and corresponding relationship, the proxy chip may determine whether the calculation result corresponds to any consumable chip in the consumable chipset. If the calculation result corresponds to any consumable chip in the consumable chipset, the authentication sequence of the authentication event corresponding to the consumable chip may be determined, and if the calculation result does not correspond to any consumable chip in the consumable chipset, above-mentioned calculation result may be obtained again.

Specific implementation manner may be same as above-mentioned manner of determining the authentication sequence, which may not be described in detail herein.

In another optional implementation manner, the plurality of consumable chips in the consumable chipset may obtain the plurality of random numbers, and then determine the authentication sequence data according to obtained random numbers and pre-stored corresponding relationship.

The plurality of consumable chips in the consumable chipset may obtain the plurality of random numbers, which may include that the plurality of consumable chips in the consumable chipset may obtain the plurality of above-mentioned random numbers from themselves and the image forming apparatus, which may not be limited in the present disclosure.

Obtaining above-mentioned corresponding relationship between the plurality of consumable chips in the consumable chipset may include that the plurality of consumable chips in the consumable chipset may respectively obtain above-mentioned corresponding relationship from themselves, other consumable chips, or communication with the image forming apparatus.

Specific implementation manner may be same as above-mentioned manner of determining the authentication sequence, which may not be described in detail herein.

In embodiment three, the authentication sequence data may be determined according to the preset dynamic parameter in combination with consumable attribute information corresponding to each consumable chip in the consumable chipset.

In above-mentioned embodiment, there are some possible scenarios. When the occurrence sequence of authentication events corresponding to at least two consumable chips may not be determined according to the preset dynamic parameter obtained for the first time, the occurrence sequence of authentication events may be difficult to be determined. One way may be to re-obtain the preset dynamic parameter to determine the occurrence sequence of corresponding authentication events herein; and another way may be to introduce the consumable attribute information stored in the consumable chip to further determine the occurrence sequence corresponding to above-mentioned authentication events.

For example, if the consumable chipset includes the plurality of consumable chips, the occurrence sequence of the authentication events corresponding to P consumable chips cannot be determined only according to the preset dynamic parameter obtained for the first time. The occurrence sequence of the authentication events corresponding to above-mentioned P consumable chips may be determined in following manners.

In the first implementation manner of embodiment three, when the consumable attribute parameter is color information, the authentication sequence data corresponding to the plurality of authentication events may be determined according to the color information corresponding to M consumable chips.

For example, the image forming apparatus may be disposed with four consumables, which are toner cartridges of four colors including C (cyan), M (magenta), Y (yellow), and K (black); and two toner cartridges may need to determine the occurrence sequence of corresponding authentication events according to the consumable attribute information. Therefore, after obtaining the color information corresponding to two toner cartridge chips, the occurrence sequence of the authentication events corresponding to two toner cartridges may be directly determined.

For example, two above-mentioned toner cartridges are C (cyan) and M (magenta) toner cartridges, respectively. When performing the occurrence sequence of the authentication events corresponding to two color cartridges, it may determine that the occurrence sequence of the authentication event corresponding to the C (cyan) toner cartridge is earlier than the occurrence sequence of the authentication events corresponding to the M (magenta) toner cartridge according to the preset color sequencing rule.

For example, the execution main body determined by the authentication sequence data of the authentication event corresponding to above-mentioned P consumable chips may be an image forming apparatus or a consumable chip in the consumable chipset (for the convenience of description, the consumable chip is referred to as the proxy chip hereinafter) and may also be the plurality of consumable chips in the consumable chipset, which may not be limited herein.

For example, the image forming apparatus may obtain the color information stored in the consumable chips by communicating with the P consumable chips, or at least one of the P consumable chips may obtain corresponding color information by communicating with other consumable chips.

After obtaining the color information corresponding to the P consumable chips is completed, the sequence information may be generated according to the preset rule, and the authentication sequence data may be determined according to the sequence information.

When the execution main body in embodiment three is the image forming apparatus or the proxy chip and when the color information of the consumables corresponding to the consumable chips in the consumable chipset is obtained, the sequence information may be sequenced according to the preset rule, and the authentication sequence data may be determined according to the sequence information.

When the execution main body of the third method is an image forming apparatus or a proxy chip and when the color information of the consumables corresponding to the consumable chips in the consumable chipset is obtained, the sequence information may be generated according to the preset rules. Therefore, the authentication sequence data is determined according to the sequence information.

In the second implementation manner of embodiment three, when the attribute parameter of the consumable is a serial number or a model number, the authentication sequence data corresponding to the plurality of authentication events may be determined according to the serial number or model number information corresponding to each consumable chip in the consumable chipset.

In an optional implementation, the serial numbers and its model numbers may be obtained with value ranges indicating the colors of the consumables, and the value ranges may be sequenced in a descending sequence, and the sequence of the authentication events corresponding to all consumable chips may be determined according to the sequencing result.

For example, corresponding value ranges that can represent the colors of the consumables selected from the serial numbers or model numbers of four toner cartridges C, M, Y, and K may be 5, 6, 3, and 2, respectively; and the result of sequencing the value ranges from largest to smallest may be 6, 5, 3, and 2, respectively. Therefore, it determines that the occurrence sequence of the authentication events corresponding to four toner cartridges may be the authentication event corresponding to M toner cartridge, the authentication event corresponding to C toner cartridge, the authentication event corresponding to Y toner cartridge, and the authentication event corresponding to K toner cartridge. Obviously, the occurrence sequence of the authentication events corresponding to four toner cartridges may be the authentication event corresponding to K toner cartridge, the authentication event corresponding to Y toner cartridge, the authentication event corresponding to C toner cartridge, and the authentication event corresponding to M toner cartridge.

In another optional implementation, since the serial numbers and model numbers of all consumables are different, the ASCII code (American Standard Code for Information Interchange) corresponding to the serial numbers or model numbers of all consumables may be cumulated, the cumulative values may be sequenced according to magnitudes, and the occurrence sequence of the authentication events corresponding to all consumable chips may be determined according to the sequencing result.

Figure 4:
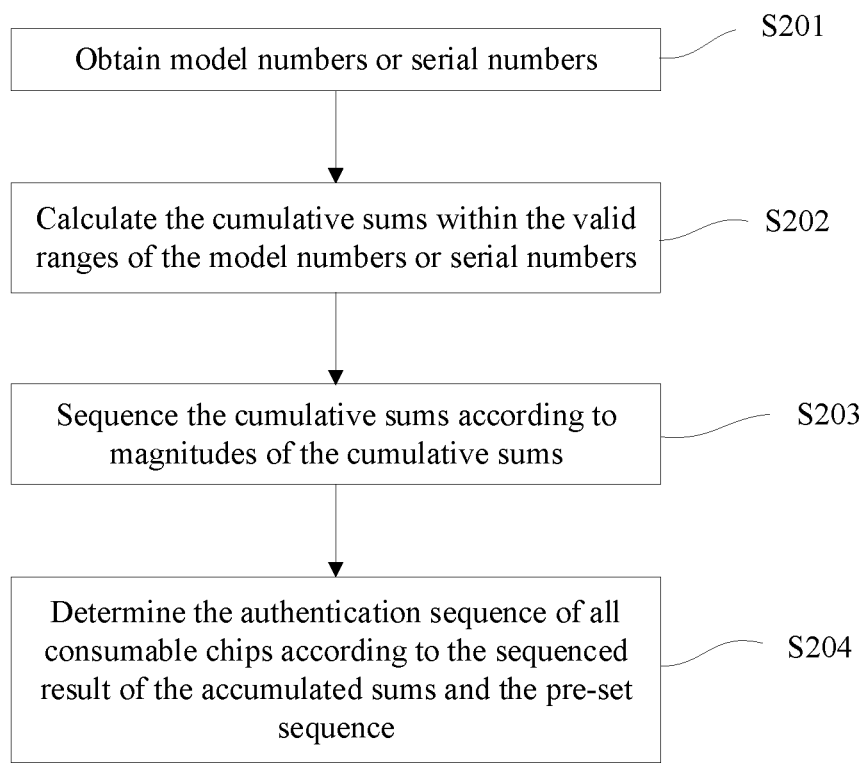
FIG. 4 illustrates a flow chart of a method for determining an authentication sequence of all consumable chips according to serial numbers or model numbers provided by exemplary embodiments of the present disclosure.

Referring to FIG. 4, when the authentication sequence of all consumable chips may be determined according to the magnitudes of the cumulative sums of ASCII code corresponding to the serial numbers or the model numbers of consumables, the following exemplary steps may be included.

At S201, the model numbers or serial numbers may be obtained.

At S202, the cumulative sums within the valid ranges of the model numbers or serial numbers may be calculated.

At S203, the cumulative sums may be sequenced according to magnitudes.

At S204, the authentication sequence of all consumable chips may be determined according to the sequenced result of the cumulative sums and a pre-set sequence.

The pre-set sequence may be the sequence from large to small, or from small to large. The authentication sequence of consumables may be determined according to the sequence of cumulative sums from large to small; or may be determined according to the sequence of cumulative sums from small to large.

For example, the serial numbers corresponding to two consumables may be serial number 1 and serial number 2, where the serial number 1 may be 0e763fed45b5e5b21f, and the serial number 2 may be 0e763fed45b5e5b2a7.

For example, the cumulative sums corresponding to the serial number 1 and the serial number 2 may be determined according to following exemplary steps.

First, the serial number 1 and the serial number 2 may be grouped.

Corresponding determined hexadecimal data for grouping the serial number 1 may be 0e, 76, 3f, ed, 45, b5, e5, b2, and 1f, respectively.

Corresponding determined hexadecimal data for grouping the serial number 2 may be 0e, 76, 3f, ed, 45, b5, e5, b2, and a7, respectively.

Then, the decimal data corresponding to grouped data may be obtained.

The decimal data corresponding to the serial number 1 may be 14, 118, 63, 237, 69, 181, 229, 178, and 31, respectively.

The decimal data corresponding to the serial number 2 may be 14, 118, 63, 237, 69, 181, 229, 178, and 167, respectively.

Finally, the cumulative sum corresponding to the serial number may be obtained.

The cumulative sum corresponding to the serial number 1 may be 14+118+63+237+69+181+229+178+31=1120; and the cumulative sum corresponding to the serial number 2 may be 14+118+63+237+69+181+229+178+167=1256. In such way, the authentication sequence data corresponding to the consumable 1 and the consumable 2 may be determined according to the cumulative sum corresponding to the serial number 1 and the cumulative sum corresponding to the serial number 2.

For the third implementation manner of embodiment three, when the consumable attribute parameter includes consumable service life information and production date, the authentication sequence data corresponding to the plurality of authentication events may be determined according to the magnitude relationship of the consumable service life information or production dates corresponding to all consumable chips in the consumable chipset.

For example, when obtaining the consumable service life information or production dates corresponding to the consumable chips in the consumable chipset, the sequence information may be generated by sequencing according to a preset rule, so that the authentication sequence data may be determined according to the sequence information.

For the fourth manner, when the preset dynamic parameter is the status information for determining the authentication sequence corresponding to each consumable chip in the consumable chipset, the authentication sequence data may be determined according to the status information corresponding to each consumable chip.

The status information for determining the authentication sequence may include a competitive status and a non-competitive status.

The authentication sequence data may be determined according to the status information corresponding to each consumable chip, which may be that two consumable chips in the consumable chipset may declare their own statuses in a pairwise manner; when current statuses are inconsistent, it determines that the authentication event corresponding to the consumable chip in the competitive status occurs earlier than the authentication event corresponding to the consumable chip in the non-competitive status; and when current statuses are consistent, their own statuses may be declared again.

For example, four consumables may be disposed in the image forming apparatus, which are toner cartridges of four colors including C (cyan), M (magenta), Y (yellow), and K (black). The following exemplary steps may be included.

a) any two of four toner cartridges may respectively declare current statuses. For example, C toner cartridge and M toner cartridge may declare their statuses. If current statuses of two toner cartridges are different, for example, C toner cartridge is in a competitive status and M toner cartridge is in a non-competitive status, it determines that the authentication event corresponding to C toner cartridge is the first authentication event to occur.

b) Then, M toner cartridge and Y toner cartridge may declare their statuses. If the current statuses of two toner cartridges are different, for example, M cartridge is in a competitive status and Y cartridge is in a non-competitive status, it determines that the authentication event corresponding to M toner cartridge is the second authentication event to occur.

c) Next, Y toner cartridge and K toner cartridge may declare their own statuses. If two current statuses are different, for example, Y toner cartridge is in a competitive status and K toner cartridge is in a non-competitive status, it determines that the authentication event corresponding to Y toner cartridge is the third authentication event to occur. Therefore, it determines that the authentication event corresponding to K toner cartridge is the fourth authentication event to occur.

It should be noted that when two toner cartridges declare a same status, their own statuses may be declared again.

Furthermore, with respect to above-mentioned manners for determining the authentication sequence data, the number of authentication events involved in determined authentication sequence data may be less than the maximum number of authentication events, which may not be limited herein.

Furthermore, in above-mentioned embodiments, the consumable may be a developing cartridge, a drum cartridge, or a process cartridge including a developing cartridge and a drum cartridge. Corresponding consumable chip may be the developing cartridge chip corresponding to the developing cartridge, or the drum cartridge chip corresponding to the drum cartridge and may also be the consumable chipset corresponding to the process cartridge, that is, include not only the drum cartridge chip corresponding to the drum cartridge, but also the developing cartridge chip corresponding to the developing cartridge.

Optionally, when the consumable is a process cartridge, that is, the consumable chipset includes the developing cartridge chip and the drum cartridge chip, in order to further improve the determination speed of the authentication sequence data, the type information of each consumable chip in the consumable chipset may be determined according to the consumable attribute information corresponding to each consumable chip in the consumable chipset, that is, whether the chip is a drum cartridge chip or a developing cartridge chip. After the information type of the consumable chips is determined, it may further specify that the authentication events corresponding to all drum cartridge chips occur earlier than the authentication events corresponding to all developing cartridge chips. Obviously, it may also determine, according to the consumable chip types, that the authentication events corresponding to all developing cartridge chips in the consumable chipset occur earlier than the authentication events corresponding to all drum cartridge chips, which may not be limited herein.

After completing the occurrence sequence of the authentication events corresponding to all drum cartridge chips and developing cartridge chips, it may further determine the occurrence sequence of the authentication events corresponding to all drum cartridge chips in the drum cartridge chipset according to other embodiments described above; and according to other above-mentioned embodiments, it may further determine the occurrence sequence of the authentication events corresponding to all developing cartridge chips in the developing cartridge chipset.

In the present disclosure, when determining the occurrence sequence of the authentication events corresponding to all consumable chips in the consumable chipset corresponding to the process cartridge, the occurrence sequence of the authentication events corresponding to the drum cartridge and the authentication events corresponding to the developing cartridge may be limited, which may improve the determination speed of the plurality of authentication events corresponding to the process cartridge.

Optionally, the type information of each consumable chip in the consumable chipset, that is, whether the chip belongs to the drum cartridge chip or the developing cartridge chip, may be determined according to the consumable attribute information corresponding to each consumable chip in the consumable chipset; after the type information of the consumable chips is determined, it may further specify that the occurrence sequence of the authentication events corresponding to all developing cartridge chips is earlier than the authentication events corresponding to all drum cartridge chips.

In embodiments of the present disclosure, the occurrence sequence of the authentication events corresponding to specified developing cartridge is earlier than the occurrence sequence of the authentication events corresponding to the drum cartridge; after the execution of the authentication events corresponding to the developing cartridge is completed, the image forming apparatus may be prepared in advance for the image forming operation, and at the same time, the authentication events corresponding to the drum cartridge may be executed. In such way, the first page output time of the image forming apparatus may be decreased, and even when the drum cartridge is determined to be abnormal, the image forming apparatus may prompt the user in time before performing the image forming operation. In addition, after completing the execution of the authentication events corresponding to the developing cartridge, once the developing cartridge is determined to be abnormal, it may directly determine not to perform the image forming operation, which may avoid the problem of damaging the image forming apparatus and the printing quality. In addition, once it determines that there is a problem with the developing cartridge, whether or not the drum cartridge satisfies the preset requirement, the problem that impair the image forming apparatus and print quality may exist. At this point, it is not necessary to execute the authentication events corresponding to the drum cartridge, thereby improving the authentication efficiency among the consumable chips.

At S13, at least one of the plurality of authentication events according to the authentication sequence data may be executed, and the authentication result of the authentication event may be fed back to the image forming apparatus.

For example, according to the above-mentioned embodiments, after determination of above-mentioned authentication sequence data is completed, each consumable chip in the consumable chipset may need to be notified to execute a corresponding authentication event.

For the convenience of description, it is assumed that two consumable chips adjacent to corresponding authentication event are consumable chip 1 and consumable chip 2 respectively, where the authentication event 1 corresponding to the consumable chip 1 occurs earlier than the authentication event 2 corresponding to the consumable chip 2.

In an optional implementation manner, after the execution of the authentication event 1 is completed, the image forming apparatus may notify the consumable chip 2 to execute the authentication event 2. Specific notification form may be that the image forming apparatus sends a preset control instruction or a preset communication signal to the consumable chip 2. The preset communication signal may be a rising edge, or a falling edge of the communication signal sent by the image forming apparatus to the consumable chip, which may not be limited herein.

In an optional implementation manner, after completing the execution of the authentication event 1, the consumable chip 1 may directly send a preset control instruction to the consumable chip 2 to notify the consumable chip 2 to execute the authentication event 2.

In an optional implementation manner, after completing the execution of the authentication event 1, the consumables chip 1 may directly feedback a preset communication signal and a control instruction to the communication bus of the image forming apparatus and the consumables chip; and the consumables chip 2 may detect the preset communication signal and control instruction fed back on the communication bus which are combined with the control information stored in the consumables chip 2, thereby obtaining the notification of the consumables chip 1.

In an optional implementation manner, after completing the execution of the authentication event 1, if the image forming apparatus determines, according to the authentication result corresponding to the authentication event 1, that there are consumables that do not meet the preset image forming requirement, the image forming apparatus may not notify the consumable chip 2 to execute the authentication event, even directly or indirectly block the consumable chip 1 from sending the notification to the consumable chip 2, or directly notify the consumable chip 2 not to perform the authentication event.

For convenience of description, the consumable chip corresponding to the first authentication event A is assumed to be the consumable chip a. Above-mentioned authentication event 1 may be the first authentication event A, and corresponding consumable chip may be the consumable chip a.

If the authentication sequence data is determined by the consumable chip a, the consumable chip a may directly execute the authentication event A.

If the determination of above-mentioned authentication sequence data is completed by the image forming apparatus or other consumable chips in the consumable chipset, the consumable chip a may receive the notification from the image forming apparatus or other consumable chips in the consumable chipset to execute the authentication event A. Specific notification form may be that the image forming apparatus may send a preset control instruction or a preset communication signal to the consumable chip a. The preset communication signal may be a rising edge or a falling edge of a communication signal (including a clock signal and a data signal) sent by the image forming apparatus to the consumable chip a, which may not be limited herein. Other consumable chips in the consumable chipset may also directly send a preset control instruction to the consumable chip a to notify the consumable chip a to execute the authentication event A. Other consumable chips in the consumable chipset may directly feedback the preset communication signal and the control instruction to the communication bus of the image forming apparatus and the consumable chip; and the consumable chip a may detect the preset communication signal and control instruction fed back on the communication bus which are combined with the control information stored in the consumable chip a to obtain notifications of other consumable chips in the consumable chipset.

It may be seen from above-mentioned description that, after the determination of the authentication sequence data is completed, other consumable chips may be notified to execute corresponding authentication events respectively.

Obviously, in embodiments of the present disclosure, only one authentication event, that is, authentication event A, may also be executed.

For example, the image forming apparatus may be disposed with consumables of four colors including C (cyan), M (magenta), Y (yellow), and K (black). When controlling each consumable chip to execute corresponding authentication event, the image forming apparatus may directly send the control instruction to the consumable chip corresponding to C consumable, so that the consumable chip corresponding to C consumable may execute corresponding authentication event and feedback the authentication result to the image forming apparatus; and the image forming apparatus may directly send the control instruction to the consumable chip corresponding to Y consumable, so that the consumable chip corresponding to Y consumable may execute corresponding authentication event and feedback the authentication result to the image forming apparatus. And so on, until the consumable chips corresponding to all consumables complete corresponding authentication events. Obviously, the control instruction may also be directly sent to the consumable chips corresponding to four color consumables C, M, Y, and K through other consumable chips in the consumable chipset.

After completing its corresponding authentication event, the consumable chip may feedback the authentication result to the image forming apparatus, and the image forming apparatus may determine whether the consumable corresponding to at least one consumable chip in the consumable chipset satisfies the preset image forming requirement.

After receiving the authentication result fed back by the consumable chip, the image forming apparatus may determine whether the consumable satisfies the preset image forming requirement, thereby determining whether the consumable is used for image forming according to the preset requirement. If yes, the consumable may be used for image forming according to the first preset requirement; if not, the consumable may be used for image forming according to the second preset requirement or the consumable may not be used for image forming. Using the consumable for image forming according to the first preset requirement may obtain normal image quality, but when using the consumable for image forming according to the second preset requirement, the image forming speed and/or obtained image quality may not meet user expectation.

In an optional implementation manner, when there is a consumable that does not meet the preset image forming requirement, the image forming apparatus may directly report an error to the user.

In the present disclosure, mutual authentication may be performed between consumable chips. On the one hand, it may effectively identify faulty consumables, and on the other hand, it may effectively avoid the problem of image quality degradation or damage to the image forming apparatus caused by mixed use of consumables produced by multiple manufacturers. Furthermore, the problem of affecting image quality caused by simultaneous existence of a plurality of consumables of a same color may also be effectively avoided. Furthermore, the problem of print quality degradation or damage to the image forming apparatus caused by malicious tampering of the consumable chips may also be effectively avoided. In addition, compared with that the image forming apparatus authenticates each consumable chip individually, mutual authentication between the consumable chips may effectively reduce the workload of the image forming apparatus. Moreover, through mutual authentication between the consumable chips, the image forming apparatus may not directly participate in whole process of authentication, which may improve authentication security and confidentiality. The image forming apparatus may not know the details of mutual authentication performed between the consumable chips, which may prevent important information leakage caused by the information interaction during mutual authentication process between the image forming apparatus and the consumables and improve authentication security and confidentiality.

In the present disclosure, the authentication sequence data corresponding to the plurality of authentication events may be determined according to the preset dynamic parameter, at least one of the plurality of authentication events may be executed according to the authentication sequence data, and the authentication result of the authentication event may be fed back to the image forming apparatus. Therefore, the image forming apparatus may determine, according to the authentication result, whether the consumables corresponding to at least one of the consumable chips in the consumable chipset are used for image forming, which may avoid following case: the consumable chip uses a single and fixed rule for security verification, which may make the security verification easy to be cracked in reverse; the consumables from multiple manufacturers are mixed in the color image forming apparatus, which may reduce the output quality of the image forming apparatus; and replacing the toner cartridge of the wrong color results in a plurality of toner cartridges of a same color, which may affect the printing effect and even cause damage to the image forming apparatus.

According to above-mentioned embodiments, the present disclosure also provides a consumable chip, where the consumable chip may be installed on a consumable, and the consumable may be detachably installed on an image forming apparatus.

The consumable chip may include a storage unit and a chip control unit. The storage unit may be configured to store the consumable attribute information; and the chip control unit may be configured to obtain determined authentication sequence data corresponding to the plurality of authentication events according to the preset dynamic parameter configured to determine the authentication sequence.

For example, the chip control unit may obtain the authentication sequence data from the consumable chip itself, the image forming apparatus, and other consumable chips. The authentication sequence data may be determined according to the preset dynamic parameter. When the preset dynamic parameter is a measurable parameter, the chip control unit may be configured to obtain determined authentication sequence data according to the magnitude relationship among the preset dynamic parameters corresponding to all consumable chips in the consumable chipset which the consumable chip belongs to.

For example, the chip control unit may obtain the authentication sequence data from the consumable chip itself, the image forming apparatus, and other consumable chips. The authentication sequence data may be determined according to the magnitude relationship among measurable parameters corresponding to all consumable chips in the consumable chipset which the consumable chip belongs to.

When the preset dynamic parameter is a plurality of random numbers or a calculation result generated according to a plurality of random numbers in combination with a preset threshold, the chip control unit may be configured to obtain determined authentication sequence data corresponding to the plurality of authentication events according to the preset dynamic parameter in combination with pre-stored corresponding relationship between the consumable chips and the determination factor of the authentication sequence data.

For example, the chip control unit may obtain the authentication sequence data from the consumable chip itself, the image forming apparatus, and other consumable chips. The authentication sequence data may be determined according to the preset dynamic parameter in combination with pre-stored corresponding relationship between the consumable chips and the determination factor of the authentication sequence data.

The corresponding relationship between the consumable chips and the determination factor of the authentication sequence data may be stored in the consumable chip, in the image forming apparatus, or in other consumable chips, which may not be limited herein.

The chip control unit may be further configured to obtain the authentication sequence data determined according to the preset dynamic parameter in combination with the consumable attribute information corresponding to each consumable chip in the consumable chipset which the consumable chip belongs to.

For example, the chip control unit may obtain the authentication sequence data from the consumable chip itself, the image forming apparatus, and other consumable chips. The authentication sequence data may be determined according to the preset dynamic parameter in combination with the consumable attribute information corresponding to each consumable chip in the consumable chipset which the consumable chip belongs to.

Furthermore, the chip control unit may be further configured to obtain, according to the consumable attribute information corresponding to all consumable chips in the consumable chipset which the consumable chip belongs to, the determined authentication sequence data for characterizing that an occurrence sequence of authentication events corresponding to all developing cartridge chips in the consumable chipset is earlier than an occurrence sequence of authentication events corresponding to all drum cartridge chips.

For example, when the consumable chipset includes the drum cartridge chip and the developing cartridge chip, the chip control unit may obtain the authentication sequence data from the consumable chip itself, the image forming apparatus, and other consumable chips, and obtain the authentication sequence data. The authentication sequence data may be determined according to the consumable attribute information of each consumable chip in the consumable chipset, characterizing that the occurrence sequence of the authentication events corresponding to all developing cartridge chips is earlier than the occurrence sequence of the authentication events corresponding to all drum cartridge chips. After obtaining required authentication sequence data, the chip control unit may be further configured to execute the authentication event according to the authentication sequence data, and feedback the authentication result of the authentication event to the image forming apparatus. The authentication result may be configured to determine whether at least one consumable corresponding to the authentication event satisfies the preset image forming requirement.

According to above-mentioned embodiments, embodiments of the present disclosure further provide a consumable chipset, where the consumable chipset may include at least two consumable chips, each consumable chip may be installed on one consumable, and the consumable may be detachably installed on the image forming apparatus.

The consumable chipset may include a storage unit, an obtaining unit, and a control unit. The storage unit may be configured to store the consumable attribute information.

The obtaining unit may be configured to obtain determined authentication sequence data corresponding to the plurality of authentication events according to the preset dynamic parameter configured to determine the authentication sequence.

The control unit may be configured to execute one authentication event according to the authentication sequence data and feeding back the authentication result of the authentication event to the image forming apparatus, where the authentication result is configured to determine whether at least one consumable, corresponding to the authentication event, in the consumable chipset satisfies the preset image forming requirement.

The control unit may at least include a chip control unit included in at least one consumable chip in the consumable chipset.

Obtaining the authentication sequence data by the obtaining unit may be that the consumable chipset may obtain the authentication sequence data from itself or the image forming apparatus, where the authentication sequence data may be determined according to the preset dynamic parameter.

For example, when the preset dynamic parameter is a measurable parameter, the obtaining unit may be configured to obtain the authentication sequence data determined according to the magnitude relationship among preset dynamic parameters corresponding to all consumable chips in the consumable chipset.

Obtaining the authentication sequence data by the obtaining unit may be that the consumable chipset may obtain the authentication sequence data from itself or the image forming apparatus, where the authentication sequence data may be determined according to the magnitude relationship among the preset dynamic parameters corresponding to all consumable chips in the consumable chipset.

When the preset dynamic parameter is a plurality of random numbers or a calculation result generated according to a plurality of random numbers in combination with a preset threshold, the obtaining unit may be configured to obtain determined authentication sequence data according to the preset dynamic parameter in combination with pre-stored corresponding relationship between the consumable chips and the determination factor of the authentication sequence data.

Obtaining the authentication sequence data by the obtaining unit may be that the consumable chipset may obtain the authentication sequence data from itself or the image forming apparatus, where the authentication sequence data may be determined according to the preset dynamic parameter in combination with pre-stored corresponding relationship between the consumable chips and the determination factor of the authentication sequence data.

For example, the obtaining unit may be configured to obtain determined authentication sequence data corresponding to the plurality of authentication events according to the preset dynamic parameter in combination with the attribute consumable information corresponding to each consumable chip in the consumable chipset.

Obtaining the authentication sequence data by the obtaining unit may be that the consumable chipset may obtain the authentication sequence data from itself or the image forming apparatus, where the authentication sequence data may be determined according to the preset dynamic parameter in combination with the consumable attribute information corresponding to each consumable chip in the consumable chipset. Furthermore, when the drum cartridge chip and the developing cartridge chip are included in the consumable chipset, the obtaining unit may be configured to obtain, according to the consumable attribute information corresponding to all consumable chips in the consumable chipset, the determined authentication sequence data for characterizing that an occurrence sequence of authentication events corresponding to all developing cartridge chips in the consumable chipset is earlier than an occurrence sequence of authentication events corresponding to all drum cartridge chips.

According to above-mentioned embodiments, embodiments of the present disclosure further provide a consumable The consumable may include a developer accommodating portion and above-mentioned consumable chip. The developer accommodating portion may be configured for accommodating a developer.

Furthermore, the consumable may further include a developer conveying portion for conveying the developer.

The developer conveying portion may include above-mentioned developing member and/or developer conveying member.

Furthermore, the consumable may also include a photosensitive portion and a charging portion, and the charging portion may be configured for charging the photosensitive portion.

For example, the photosensitive portion may be the above-mentioned photosensitive drum, and the charging portion may be above-mentioned charging roller.

In other embodiments, the consumable may include the photosensitive portion, the charging portion and the consumable chip provided in above-mentioned embodiments, and the charging portion may be configured for charging the photosensitive portion.

According to above embodiments, embodiments of the present disclosure further include an image forming apparatus. The image forming apparatus may be installed with consumables and the consumable chipset. The consumable chipset may include at least two consumable chips, and each consumable chip may be installed on the consumable. The image forming apparatus may include an obtaining unit, a determining unit, a first control unit, and a second control unit. The obtaining unit may be configured to obtain the preset dynamic parameter configured to determine the authentication sequence. The determining unit may be configured to determine the authentication sequence data corresponding to the plurality of authentication events according to the preset dynamic parameter. The first control unit may be configured to execute at least one authentication event according to the authentication sequence data, and feedback the authentication result of the authentication event to the second control unit. The second control unit may be configured to determine, according to the authentication result of the authentication event, whether the consumable corresponding to at least one consumable chip in the consumable chipset satisfies the preset image forming requirement.

The first control unit may be the control unit in above-mentioned consumable chipset, and the second control unit may be the image forming control unit of the image forming apparatus.

For example, when the preset dynamic parameter is a measurable parameter, the determining unit may be configured to determine the authentication sequence data corresponding to the plurality of authentication events according to the magnitude relationship among the preset dynamic parameters corresponding to all consumable chips in the consumable chipset.

When the preset dynamic parameter is a plurality of random numbers or a calculation result generated according to a plurality of random numbers in combination with a preset threshold, the determining unit may be configured to determine the authentication sequence data according to the preset dynamic parameter in combination with pre-stored corresponding relationship between the consumable chips and the determination factor of the authentication sequence data.

For example, the determining unit may be configured to determine the authentication sequence data corresponding to the plurality of authentication events according to the preset dynamic parameter in combination with the consumable attribute information corresponding to each consumable chip in the consumable chipset.

Furthermore, when the drum cartridge chip and the developing cartridge chip are included in the consumable chipset, the determining unit may be further configured to determine, according to the consumable attribute information corresponding to each consumable chip in the consumable chipset, that the authentication events corresponding to all developing cartridge chips in the consumable chipset occur earlier than the authentication events corresponding to all drum cartridge chips.

From above-mentioned embodiments, it may be seen that the solutions provided by the present disclosure may achieve at least following beneficial effects.

Mutual authentication may be performed between consumable chips. On the one hand, it may effectively identify faulty consumables, and on the other hand, it may effectively avoid the problem of image quality degradation or damage to the image forming apparatus caused by mixed use of consumables produced by multiple manufacturers. Furthermore, the problem of affecting image quality caused by simultaneous existence of a plurality of consumables of a same color may also be effectively avoided. Furthermore, the problem of print quality degradation or damage to the image forming apparatus caused by malicious tampering of the consumable chips may also be effectively avoided.

Mutual authentication between the consumable chips may effectively reduce the workload of the image forming apparatus. Moreover, through mutual authentication between the consumable chips, the image forming apparatus may not directly participate in whole process of authentication, which may improve authentication security and confidentiality. The image forming apparatus may not know the details of mutual authentication performed between the consumable chips, which may prevent important information leakage caused by the information interaction during mutual authentication process between the image forming apparatus and the consumables and improve authentication security and confidentiality.

Parameters such as consumable consumption information, random numbers and other parameters may be configured to determine the occurrence sequence of authentication events corresponding to all consumable chips in the consumable chipset, so that all consumable chips may authenticate other consumable chips according to determined occurrence sequence, which may avoid conflict and interference.

The occurrence sequence of authentication events corresponding to all consumable chips in the consumable chipset may be determined through dynamic parameters such as consumables consumption information and random numbers, and the randomness may be higher, such that the reliability of mutual authentication between all consumable chips may be higher, and the execution sequence of all authentication events may not be fixed. Therefore, the difficulty of reverse cracking of subsequent security verification solution may be improved, and the problems of damaging the image forming apparatus and affecting the printing quality caused by the use of consumables provided by third parties that do not meet the requirements may be avoided.

When determining the occurrence sequence of the authentication events corresponding to all consumable chips in the consumable chipset corresponding to the process cartridge, the occurrence sequence of the authentication events corresponding to the drum cartridge and the authentication events corresponding to the developing cartridge may be limited.

On the one hand, the determination speed of the plurality of authentication events corresponding to the process cartridge may be improved. On the other hand, after the execution of the authentication events corresponding to the developing cartridge is completed, the image forming apparatus may be prepared in advance for the image forming operation, and at the same time, the authentication events corresponding to the drum cartridge may be executed. In such way, the first page output time of the image forming apparatus may be decreased, and even when the drum cartridge is determined to be abnormal, the image forming apparatus may prompt the user in time before performing the image forming operation. In addition, after completing the execution of the authentication events corresponding to the developing cartridge, once the developing cartridge is determined to be abnormal, it may directly determine not to perform the image forming operation, which may avoid the problem of damaging the image forming apparatus and the printing quality. In addition, once it determines that there is a problem with the developing cartridge, whether or not the drum cartridge satisfies the preset requirement, the problem that impair the image forming apparatus and print quality may exist. At this point, it is not necessary to execute the authentication events corresponding to the drum cartridge, thereby improving the authentication efficiency between the consumable chips.

Above are only optional embodiments of the present disclosure, but the protection scope of the present disclosure may not be limited thereto. Any changes or substitutions that may be easily conceived by those skilled in the art within the technical scope disclosed in the present disclosure shall be covered by the protection scope of the present disclosure. Therefore, the protection scope of the present disclosure should be subject to the protection scope of the claims.

What is claimed is:

1. A security verification method of a consumable chipset, wherein the consumable chipset includes at least two consumable chips, each consumable chip is detachably installed on a consumable, and the consumable is detachably installed on an image forming apparatus, the method comprising:
   obtaining a preset dynamic parameter configured to determine an authentication sequence of a plurality of authentication events;
   determining authentication sequence data corresponding to the plurality of authentication events according to the preset dynamic parameter; and
   executing at least one of the plurality of authentication events according to the authentication sequence data and feeding back an authentication result of the at least one of the plurality of authentication events to the image forming apparatus, wherein:
      the authentication result is configured to determine whether a consumable corresponding to one of the at least two consumable chips in the consumable chipset satisfies a preset image forming requirement, and
      an authentication event of the plurality of authentication events is an event that one consumable chip in the consumable chipset authenticates another consumable chip in the consumable chipset.

2. The method according to claim 1, wherein when the preset dynamic parameter is a measurable parameter, determining the authentication sequence data corresponding to the plurality of authentication events according to the preset dynamic parameter includes:
   determining the authentication sequence data according to a magnitude relationship among measurable parameters corresponding to the at least two consumable chips in the consumable chipset.

3. The method according to claim 1, wherein when the preset dynamic parameter is a plurality of random numbers or a calculation result generated according to the plurality of random numbers in combination with a preset threshold, determining the authentication sequence data corresponding to the plurality of authentication events according to the preset dynamic parameter includes:
   determining the authentication sequence data according to the preset dynamic parameter in combination with a pre-stored corresponding relationship between consumable chips and a determination factor of the authentication sequence data.

4. The method according to claim 1, wherein determining the authentication sequence data corresponding to the plurality of authentication events according to the preset dynamic parameter includes:
   determining the authentication sequence data according to the preset dynamic parameter in combination with consumable attribute information corresponding to the at least two consumable chips in the consumable chipset.

5. The method according to claim 4, wherein when the consumable chipset includes developing cartridge chips and drum cartridge chips, determining the authentication sequence data according to the preset dynamic parameter in combination with the consumable attribute information corresponding to the at least two consumable chips in the consumable chipset includes:
   determining, according to the consumable attribute information corresponding to the at least two consumable chips in the consumable chipset, that an occurrence sequence of authentication events corresponding to all developing cartridge chips in the consumable chipset is earlier than an occurrence sequence of authentication events corresponding to all drum cartridge chips.

6. A consumable chip, wherein the consumable chip is capable of being installed on a consumable, and the consumable is capable of being detachably installed on an image forming apparatus, the consumable chip comprising:
   a storage unit, configured to store consumable attribute information; and
   a chip control unit, configured to obtain determined authentication sequence data corresponding to a plurality of authentication events, wherein the determined authentication sequence data is determined according to a preset dynamic parameter, and the preset dynamic parameter is configured to determine an authentication sequence of the plurality of authentication events,
   wherein: the consumable chip is included in a consumable chipset; and an authentication event of the plurality of authentication events is an event that the consumable chip authenticates another consumable chip in the consumable chipset; and the storage unit, the chip control unit and the preset dynamic parameter are implemented using at least one or more processors or a memory.

7. The consumable chip according to claim 6, wherein when the preset dynamic parameter is a measurable parameter, the chip control unit is configured to:
   obtain the determined authentication sequence data according to a magnitude relationship among measurable parameters corresponding to all consumable chips in the consumable chipset which the consumable chip belongs to.

8. The consumable chip according to claim 6, wherein when the preset dynamic parameter is a plurality of random numbers or a calculation result generated according to the plurality of random numbers in combination with a preset threshold, the chip control unit is configured to:
obtain the determined authentication sequence data according to the preset dynamic parameter in combination with a pre-stored corresponding relationship between consumable chips and a determination factor of the authentication sequence data.

9. The consumable chip according to claim 6, wherein:
the chip control unit is further configured to determine the authentication sequence data according to the preset dynamic parameter in combination with consumable attribute information corresponding to all consumable chips in the consumable chipset which the consumable chip belongs to.

10. The consumable chip according to claim 9, wherein:
the chip control unit is further configured to obtain, according to the consumable attribute information corresponding to all consumable chips in the consumable chipset which the consumable chip belongs to, the determined authentication sequence data for characterizing that an occurrence sequence of authentication events corresponding to all developing cartridge chips in the consumable chipset is earlier than an occurrence sequence of authentication events corresponding to all drum cartridge chips.

11. The consumable chip according to claim 6, wherein:
the chip control unit is further configured to execute one authentication event according to the authentication sequence data and feeding back an authentication result of the authentication event to the image forming apparatus, wherein the authentication result is configured to determine whether at least one consumable corresponding to the authentication event satisfies a preset image forming requirement.

12. A consumable, comprising:
a developer accommodating portion for accommodating a developer; and
the consumable chip according to claim 6.

13. The consumable according to claim 12, further comprising:
a developer conveying portion, configured to convey the developer.

14. The consumable according to claim 13, further comprising:
a photosensitive portion; and
a charging portion, configured to charge the photosensitive portion.

15. A consumable, comprising:
a photosensitive portion;
a charging portion, configured to charge the photosensitive portion; and
a consumable chip according to claim 6.

16. A consumable chipset, wherein the consumable chipset includes at least two consumable chips, each consumable chip is capable of being installed on a consumable, and the consumable is capable of being detachably installed on an image forming apparatus, the consumable chipset comprising:
a storage unit, configured to store consumable attribute information;
an obtaining unit, configured to obtain determined authentication sequence data corresponding to a plurality of authentication events, wherein the determined authentication sequence data is determined according to a preset dynamic parameter, and the preset dynamic parameter is configured to determine an authentication sequence of the plurality of authentication events; and
a control unit, configured to execute at least one of the plurality of authentication events according to the authentication sequence data and feed back an authentication result of the at least one of the plurality of authentication events to the image forming apparatus, wherein the authentication result is configured to determine whether at least one consumable, corresponding to the authentication event, in the consumable chipset satisfies a preset image forming requirement,
wherein an authentication event of the plurality of authentication events is an event that one consumable chip in the consumable chipset authenticates another consumable chip in the consumable chipset; and the storage unit, the obtaining unit, the preset dynamic parameter and the control unit are implemented using at least one or more processors or a memory.

17. The consumable chipset according to claim 16, wherein when the preset dynamic parameter is a measurable parameter, the obtaining unit is configured to:
obtain the determined authentication sequence data according to a magnitude relationship among measurable parameters corresponding to the at least two consumable chips in the consumable chipset.

18. The consumable chipset according to claim 16, wherein when the preset dynamic parameter is a plurality of random numbers or a calculation result generated according to the plurality of random numbers in combination with a preset threshold, the obtaining unit is configured to:
obtain the determined authentication sequence data according to the preset dynamic parameter in combination with a pre-stored corresponding relationship between consumable chips and a determination factor of the authentication sequence data.

19. The consumable chipset according to claim 16, wherein:
the obtaining unit is further configured to obtain the determined authentication sequence data according to the preset dynamic parameter in combination with consumable attribute information corresponding to the at least two consumable chips in the consumable chipset.

20. The consumable chipset according to claim 19, wherein:
when the consumable chipset includes developing cartridge chips and drum cartridge chips, the obtaining unit is further configured to obtain, according to the consumable attribute information corresponding to the at least two consumable chips in the consumable chipset, the determined authentication sequence data for characterizing that an occurrence sequence of authentication events corresponding to all developing cartridge chips in the consumable chipset is earlier than an occurrence sequence of authentication events corresponding to all drum cartridge chips.

* * * * *